United States Patent [19]
Ohga et al.

[11] Patent Number: 5,465,385
[45] Date of Patent: Nov. 7, 1995

[54] CATV SYSTEM WITH AN EASY PROGRAM RESERVATION

[75] Inventors: Eiji Ohga; Masahiko Kawasaki; Kazushi Sakuma; Tatsuo Takahashi; Ryusuke Tozaki, all of Tokyo, Japan

[73] Assignee: Pioneer Electronic Corporation, Tokyo, Japan

[21] Appl. No.: 200,907

[22] Filed: Feb. 23, 1994

Related U.S. Application Data

[63] Continuation of Ser. No. 965,447, Oct. 23, 1992, abandoned.

[30] Foreign Application Priority Data

Oct. 28, 1991 [JP] Japan ................................... 3-281450

[51] Int. Cl.$^6$ .................................................. H04H 1/02
[52] U.S. Cl. ..................... 455/6.1; 455/3.1; 455/181.1; 455/185.1; 348/6
[58] Field of Search .............................. 455/3.1, 4.2, 6.1, 455/6.2, 6.3, 4.1, 181.1, 185.1, 186.1, 186.2, 3.2; 348/6, 7, 10, 8

[56] References Cited

U.S. PATENT DOCUMENTS

| | | | |
|---|---|---|---|
| 4,264,924 | 4/1981 | Freeman | 358/86 |
| 4,706,121 | 11/1987 | Young | 358/142 |
| 4,977,455 | 12/1990 | Young | 455/186.1 |
| 5,031,045 | 7/1991 | Kawasaki | 455/181.1 |
| 5,101,508 | 3/1992 | Owaki | 455/181.1 |
| 5,151,789 | 9/1992 | Young | 358/86 |

*Primary Examiner*—Reinhard J. Eisenzopf
*Assistant Examiner*—Nguyen Vo
*Attorney, Agent, or Firm*—Sughrue, Mion, Zinn, Macpeak & Seas

[57] ABSTRACT

Based on in-band data transmitted from a center facility that include titles, start times, lengths and channel numbers of respective programs of linked channels, the titles and start times are displayed together with selection numbers on a TV receiver upon depression of a schedule switch by a user. While watching a displayed picture, the user selects one of the selection numbers. Data indicating the start time, length and channel of the selected program is stored in a timer reservation area of a memory. The selected program is automatically displayed based on the stored data.

16 Claims, 7 Drawing Sheets

| | | PD1 | | | | PD2 | |
|---|---|---|---|---|---|---|---|
| | LINK INF. | TITLE OF MOVIE | START TIME | LENGTH | TITLE OF MOVIE | START TIME | LENGTH |
| ch10 | 11 | A A A | 9:00 | 2 HOURS | D D D | 11:00 | 2 AND A HALF HOURS |
| ch11 | 12 | B B B | 10:00 | 2 AND A HALF HOURS | F F F | 12:30 | 2 HOURS |
| ch12 | 13 | C C C | 10:30 | 2 AND A HALF HOURS | G G G | 13:00 | 2 HOURS |
| ch13 | 10 | E E E | 12:00 | 2 HOURS | H H H | 14:00 | 2 HOURS |

| | LINK INF. | TITLE OF MOVIE | START TIME | LENGTH | TITLE OF MOVIE | START TIME | LENGTH |
|---|---|---|---|---|---|---|---|
| ch10 | 11 | AAA | 9:00 | 2 HOURS | DDD | 11:00 | 2 AND A HALF HOURS |
| ch11 | 12 | BBB | 10:00 | 2 AND A HALF HOURS | FFF | 12:30 | 2 HOURS |
| ch12 | 13 | CCC | 10:30 | 2 AND A HALF HOURS | GGG | 13:00 | 2 HOURS |
| ch13 | 10 | EEE | 12:00 | 2 HOURS | HHH | 14:00 | 2 HOURS |

| | TITLE OF MOVIE | START TIME | LENGTH | |
|---|---|---|---|---|
| 1 | A A A | 9:00 | 2:00 | 10 |
| 2 | B B B | 10:00 | 2:30 | 11 |
| ⋮ | ⋮ | ⋮ | ⋮ | ⋮ |
| 8 | H H H | 14:00 | 2:00 | 13 |

FIG. 8

```
        PROGRAM  GUIDE

1     AAA         9:00
    2     BBB        10:00
    3     CCC        10:30
    4     DDD        11:00
    5     EEE        12:00
    6     FFF        12:30
    7     GGG        13:00
    8     HHH        14:00
```

5,465,385

CATV SYSTEM WITH AN EASY PROGRAM RESERVATION

This is a Continuation of application Ser. No. 07/965,447 filed Oct. 23, 1992, now abandoned.

BACKGROUND OF THE INVENTION

The present invention relates to a CATV (cable television or community antenna television) system and a terminal apparatus used therein.

In CATV systems, a center facility provides own programs and commercial broadcast programs on the air to a plurality of subscriber terminal apparatuses via transmission cables. In recent years, services of CATV systems include data transmission. Further, bi-directional CATV systems are now operated in which each terminal apparatus can transmit a signal (i.e., an up signal) to a center facility. CATV systems limitedly operated in schools, hotels, etc. are specifically called "CCTV (closed circuit television) system".

In the conventional CATV systems, when a user reserves a certain program to receive it automatically by a timer operation, he needs to input all the necessary data, such as a start time, an end time, a channel number and a day of the week, using a keyboard or a remote controller, which is a complex operation. In particular, reservation of a plurality of programs requires a very long procedure, i.e., complex, cumbersome operations, and it is sometimes the case that a program reservation attempt results in a failure due to an input mistake etc.

SUMMARY OF THE INVENTION

An object of the invention is to provide a CATV system and a terminal apparatus in which a timer reservation of a desired program can be performed by a simple operation.

According to the invention, a CATV terminal apparatus for receiving a television signal transmitted from a CATV center facility and providing the received television signal to a TV receiver comprises:

means for displaying, on the TV receiver upon receiving a first instruction from a user, information indicating programs being broadcast or scheduled to be broadcast based on program data transmitted from the center facility, the program data including titles, start times, lengths and channel numbers of the respective programs;

means for receiving a second instruction indicating one of the programs that has been selected by the user;

means for storing data indicating the start time, length and channel number of the selected program; and means for automatically displaying, on the TV receiver based on the stored data, the selected program during a period defined by the start time and the length.

Further, according to the invention, a CATV system comprises:

a center facility for transmitting, in addition to television signals, program data including titles, start times, lengths and channel numbers of respective programs being broadcast or scheduled to be broadcast; and a plurality of terminal apparatuses, each comprising:

means for displaying, on an associated TV receiver upon receiving a first instruction from a user, information indicating the programs based on the program data transmitted from the center facility;

means for receiving a second instruction indicating one of the programs that has been selected by the user;

means for storing data indicating the start time, length and channel number of the selected program; and means for automatically displaying, on the associated TV receiver based on the stored data, the selected program during a period defined by the start time and the length.

DESCRIPTION OF THE PREFERRED EMBODIMENT

An embodiment of the present invention is described hereinafter with reference to the accompanying drawings.

Figure 1:
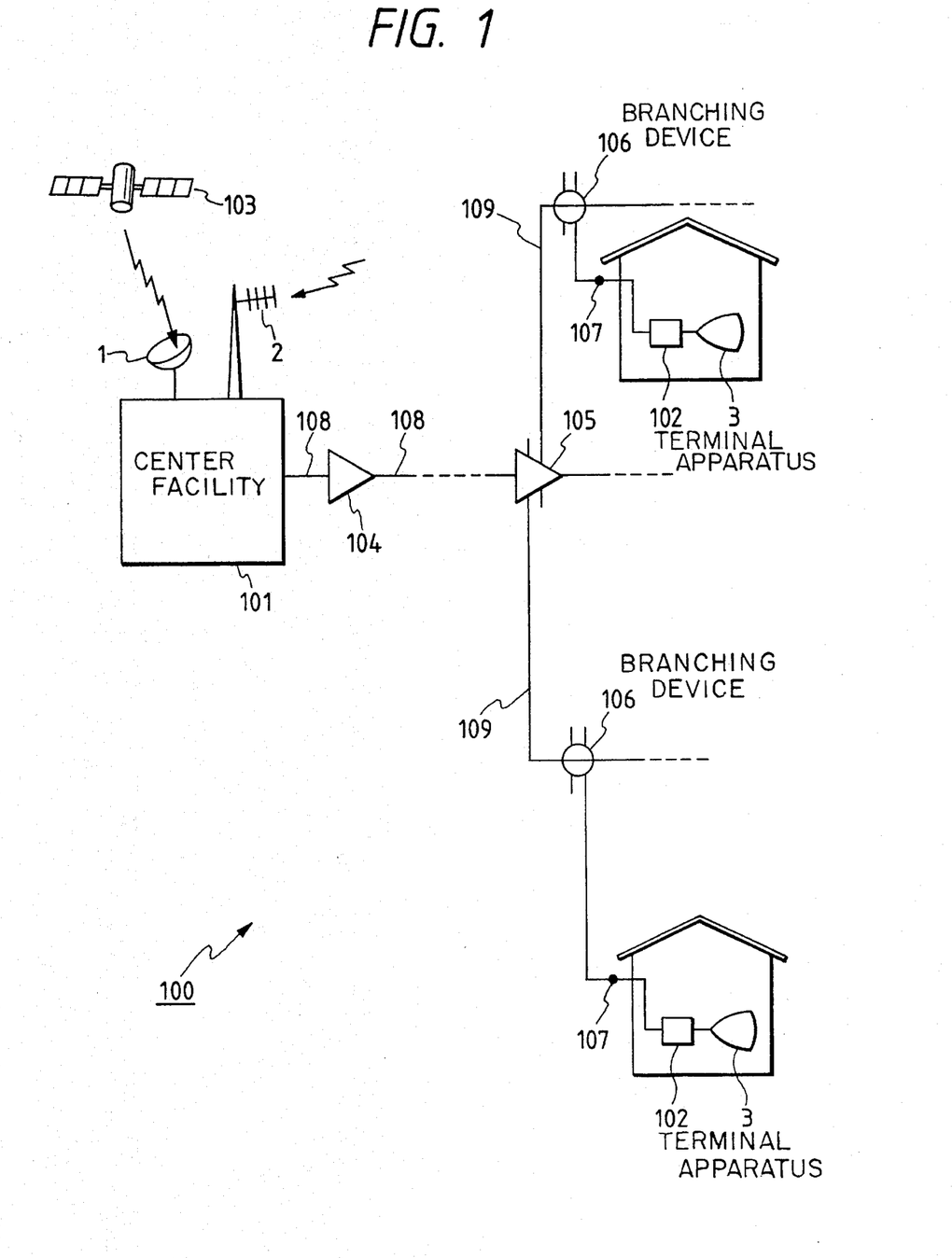
FIG. 1 is a block diagram showing a configuration of a CATV system according to an embodiment of the present invention.

FIG. 1 shows a configuration of a CATV system according to an embodiment. A CATV system 100 includes a center facility (head end) 101, a plurality of terminal apparatuses 102 and TV receivers 3 connected to the respective terminal apparatuses 102. The center facility 101 receives by an antenna 1 commercial programs transmitted from a satellite 103, and also receives ground-wave commercial programs by an antenna 2. Further, the center facility 101 produces own programs and messages (described later). After subjected to a scrambling operation for prohibiting unauthorized viewing (in the case of the own programs), a television signal is distributed to the respective terminal apparatuses 102 via transmission paths consisting of a main transmission cable 108, a main line amplifier 104, a main line branching amplifier 105, branch transmission cables 109, branching devices 106 and maintenance devices 107. In general, the distribution service is performed based on contracts with users (viewers), who are charged accordingly.

The transmitted television signal is received by the terminal apparatus 102, subjected to a descrambling operation etc., and finally sent to the TV receiver 3 for viewing by the user.

Figure 2:
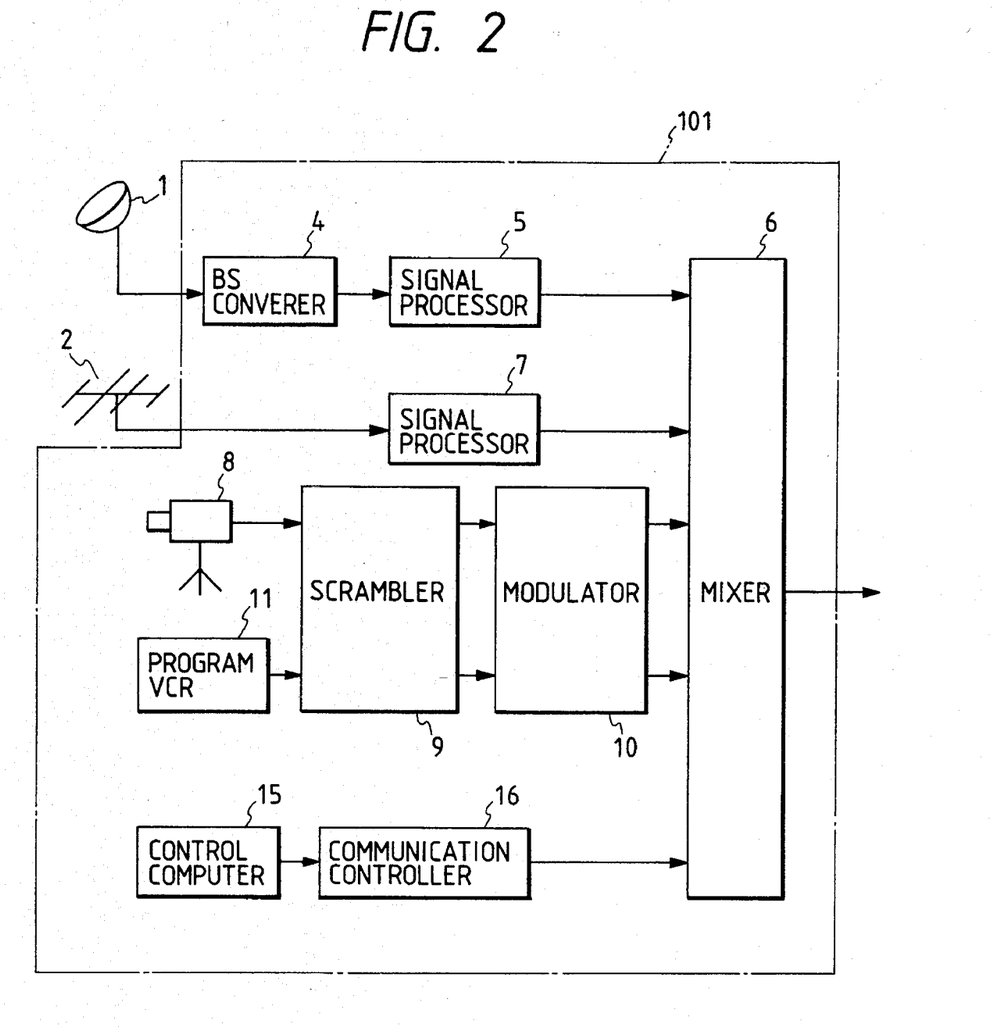
FIG. 2 is a block diagram showing a configuration of a center facility of FIG. 1.

FIG. 2 shows a configuration of the center facility 101. The center facility 101 includes the satellite-wave antenna 1, a BS converter 4 for frequency-converting a signal received by the antenna 1, a signal processor 5 and a mixer 6. A signal received by the ground-wave antenna 2 is also provided to the mixer 6 via a signal processor 7. A video signal from a TV camera 8 or a program VCR 11, i.e., a signal of a chargeable program prepared in the center facility 101 is scrambled by a scrambler 9 to prohibit unauthorized viewing, modulated by a modulator 10, and finally provided to the mixer 6. A control computer 15 produces in-band data and data for FSK modulation that are to be transmitted to the terminal apparatus 102. The output data of the control computer 15 is subjected to a modulation to become the in-band data or to an FSK modulation in the communication controller 16, and then sent to the mixer 6.

Figure 3:
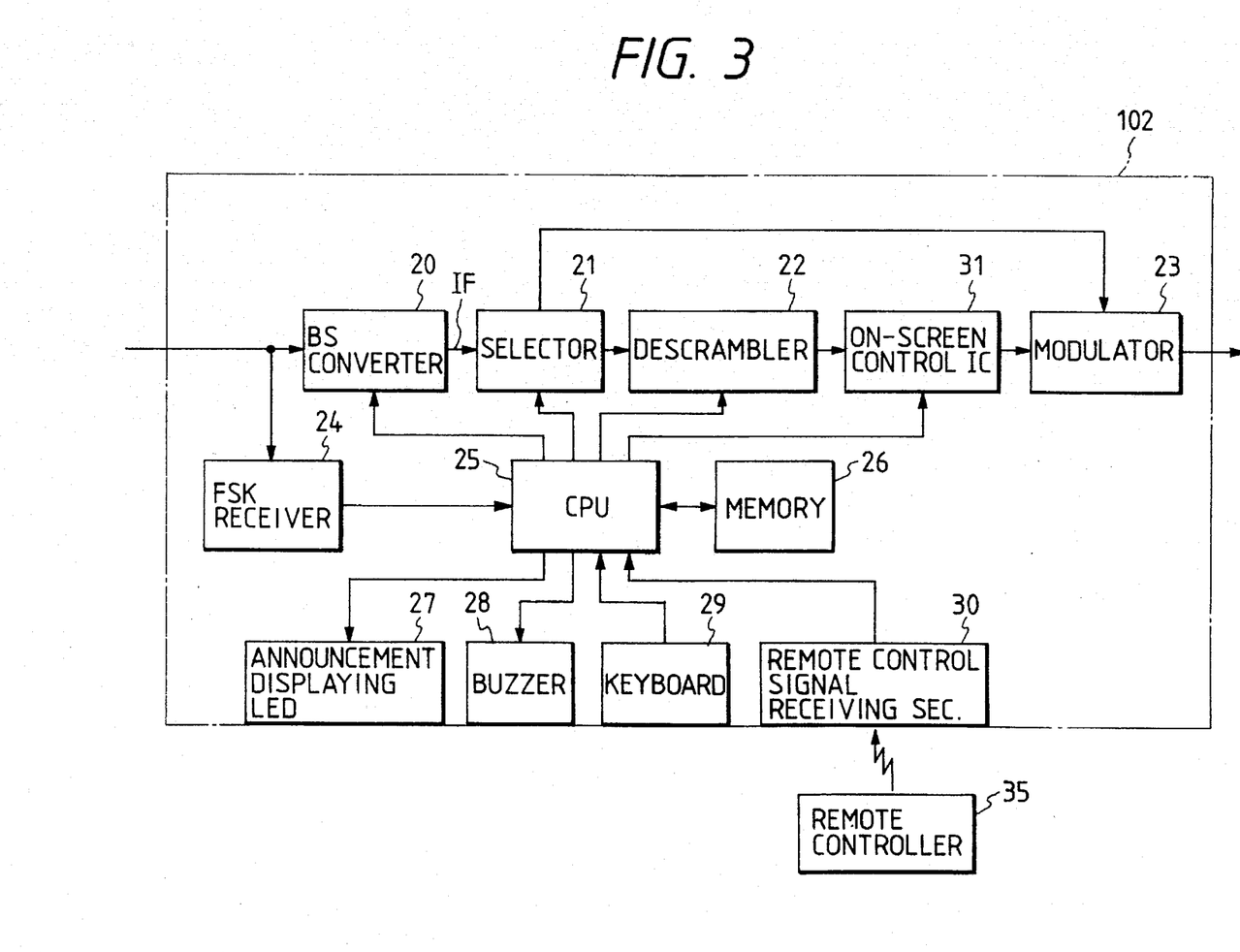
FIG. 3 is a block diagram showing a configuration of a terminal apparatus of FIG. 1.

FIG. 3 is a block diagram showing a configuration of the terminal apparatus 102. In the case of ordinary broadcast programs, an RF signal sent from the center facility 101 is input to a converter 20. The converter 20 selects a desired signal of a particular channel among input signals, and frequency-converts the selected signal to produce an intermediate frequency signal IF, which is provided to a descrambler 22 via a selector 21.

The descrambler 22 extracts scrambling data from the intermediate frequency signal IF by amplitude detection, and performs a descrambling operation in accordance with the extracted data. The descrambled signal is input to a modulator 23 via an on-screen control IC 31, which frequency-modulates the audio signal part and amplitude-modulates the video signal part and provides a resultant RF signal to the TV receiver 3. In this operation, the on-screen control IC 31 superimposes a message and other information on the video signal of a selected channel. In the case of receiving a free broadcast of a free program and an all-around emergency broadcast of, e.g., an earthquake or storm warning, the intermediate frequency signal IF is directly provided from the selector 21 to the modulator 23, i.e., without passing through the descrambler 22.

A CPU 25 controls the entire terminal apparatus 102, i.e., a memory 26, announcement displaying LED 27, buzzer 28, on-screen control IC 31, etc. Under the control of the CPU 25, the memory 26 stores various character data and setting data for the terminal apparatus 102 and various data transmitted from the center facility 101, and the announcement displaying LED 27 is flashed or the buzzer 28 is activated to inform the user of the existence of a message transmitted from the center facility 101 or occurrence of some abnormal event. The on-screen control IC 31 performs various on-screen control operations such as signal superimposing.

A keyboard 29 has a key panel (not shown) used for the input of various data. A remote control signal receiving section 30 receives and processes an input control signal from a remote controller 35, and provides a resultant signal to the CPU 25.

Figure 4:
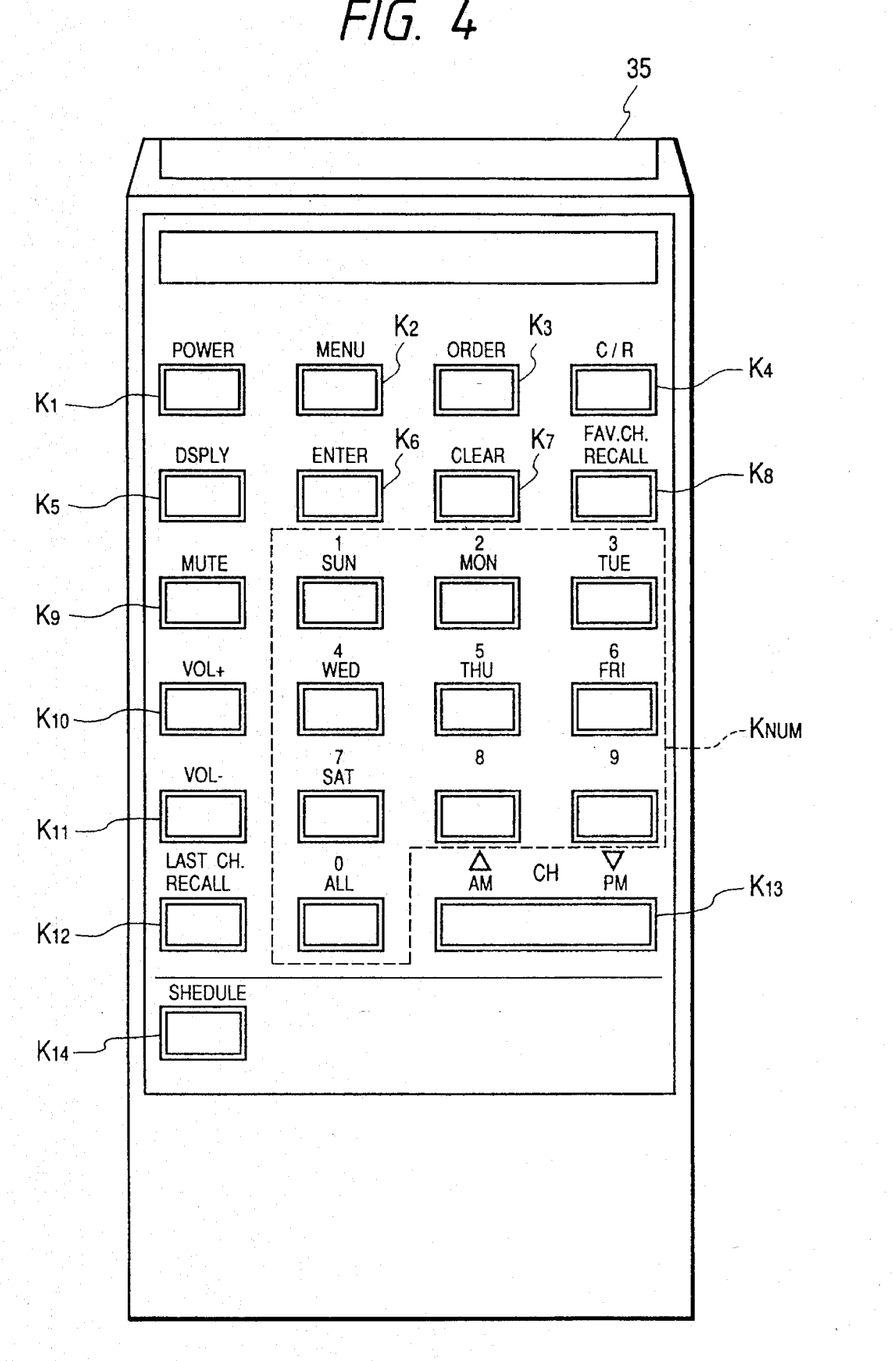
FIG. 4 shows an appearance of a remote controller.

Referring to FIG. 4, a configuration of the remote controller 35 is described below.

The remote controller 35 is constructed so as to transmit various data to a remote control signal receiving section 30 in the form of infrared light. The following buttons are provided on an operation panel of the remote controller 35: a power button $K_1$ for turning on/off the power; menu button $K_2$ for displaying a menu picture; order button $K_3$ for requesting viewing of a chargeable program; channel/response changeover button $K_4$; display button $K_5$ for displaying various information on the TV receiver 3; enter button $K_6$ for confirming allowance of inputting various data; clear button $K_7$; memory recall button $K_8$ for reading out memory contents; mute button $K_9$ for muting an output audio signal of the TV receiver 3; volume-up button $K_{10}$; volume-down button $K_{11}$; last channel recall button $K_{12}$ for displaying on the TV receiver 3 a program of a channel selected immediately before the present channel; seesaw-like channel up/down button $K_{13}$; schedule button $K_{14}$ for a timer reservation; and numeral button group $K_{NUM}$ having ten buttons of a "1" button through a "0" button. In the case of setting a timer operation, the "1" through "7" buttons are used as days-of-the-week buttons (i.e., a Sunday button through a Saturday button), the "0" button is used as an every day button for designating all of Sunday through Saturday, and the channel up/down button $K_{13}$ is used as a morning/afternoon button. It is noted that keys equivalent to the above buttons are also provided on the key panel of the keyboard 29.

Next, the operation of the terminal apparatus 102 is described with reference to FIGS. 5–8.

Figure 5:
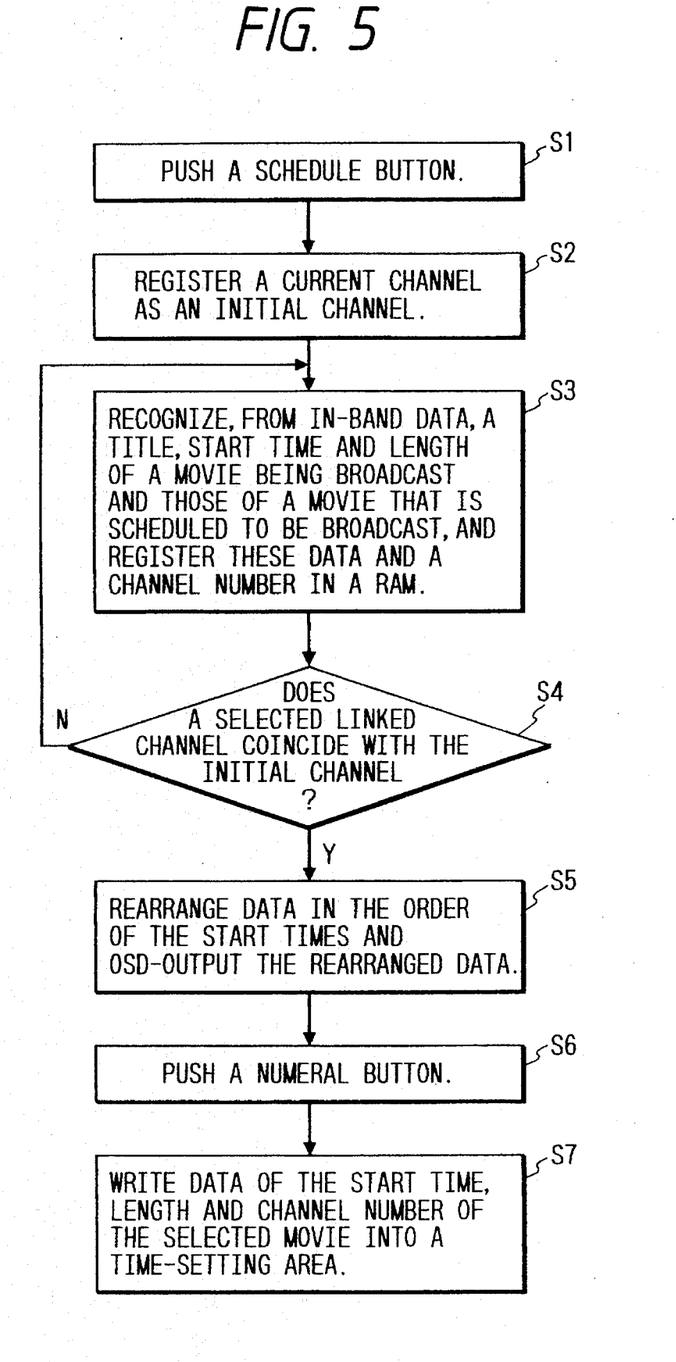
FIG. 5 is a flowchart showing an operation of timer reservation.

Referring to a flowchart of FIG. 5, when the schedule button $K_{14}$ of the keyboard 29 or remote controller 35 is depressed (step S1), the CPU 25 registers a current channel as an initial channel (step S2).

Then, for example, the CPU 25 recognizes, from the in-band data, a title, a start time and a length of a movie being broadcast and those of a movie that is scheduled to be broadcast next time, and registers these data and a channel number in a RAM (not shown) of the memory 26 (step S3).

Figure 6:
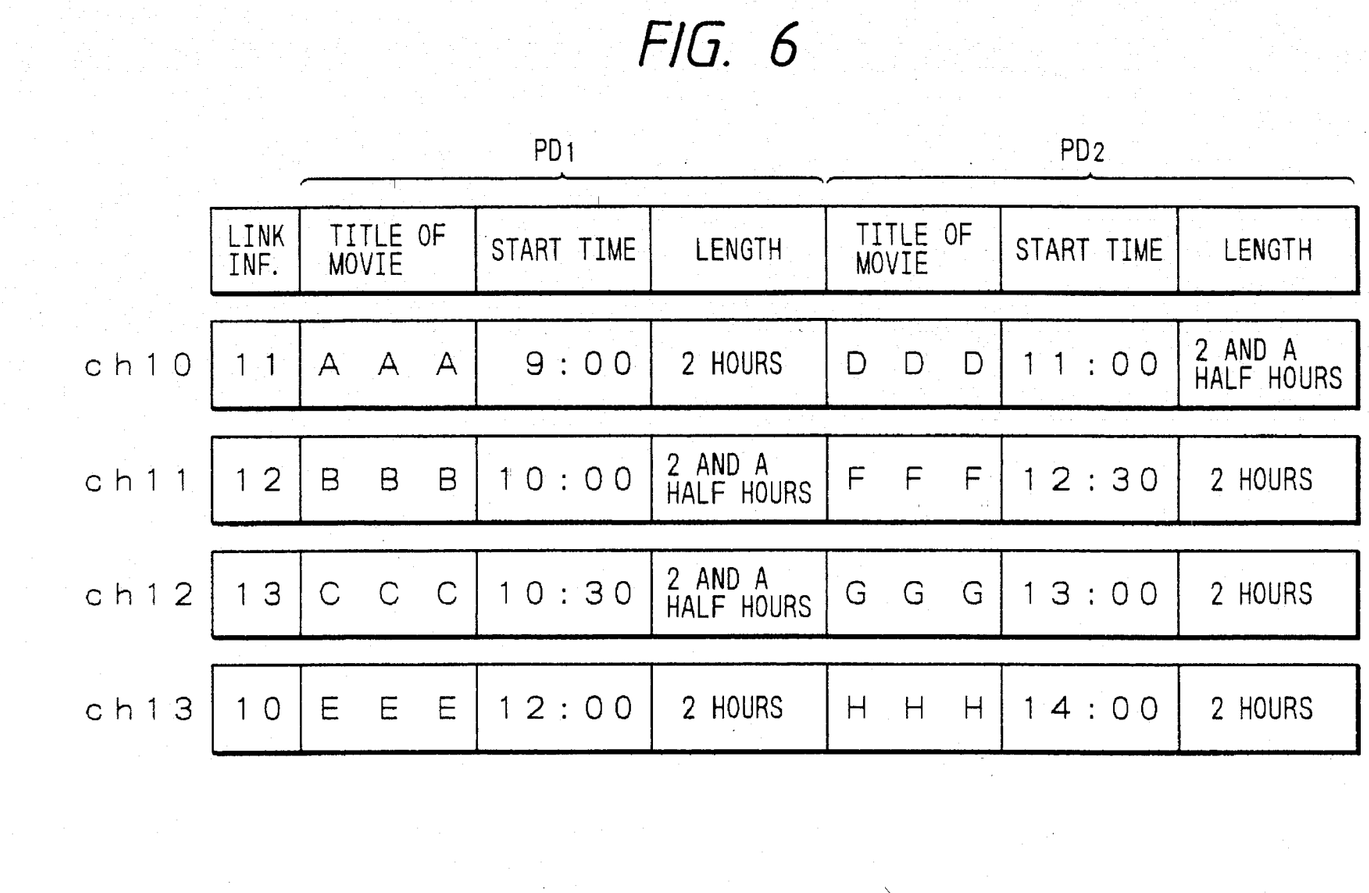
FIG. 6 shows a structure of in-band data.

As shown in FIG. 6, the in-band data ID consists of first program data $PD_1$ including link information and a title, a start time and a length of, for instance, a movie being broadcast, and second program data $PD_2$ including a title, a start time and a length of, for instance, a movie that is scheduled to be broadcast next time on the corresponding channel. The in-band data ID is transmitted from the center facility 101 while being superimposed on the television signal. The link information shown in FIG. 6 indicates, for instance, how pay-per-view programs are linked. In addition, the link information may be that for "VCR timer," "favorite channels," "particular movies," etc. A user selects one of the items of pay-per-view, VCR timer, favorite channels, particular movies while watching a menu picture.

Next, the CPU 25 judges whether one of linked channels that has been selected based on the link information coincides with the initial channel (step S4). The "linked channels" are channels that are logically coupled to each other. In the present embodiment, all the channels (channels 10–13) that are transmitting movie programs (chargeable programs) constitute linked channels having a ring-like linkage. The CPU 25 analyzes the in-band data while selecting the initial channel first and then continuing the channel selection until finishing a selection of all the linked channels and returning to the initial channel.

If the selected linked channel does not coincides with the initial channel, i.e., if not all the in-band data of the linked channels have been analyzed, step S3 is repeated (step S4).

Figure 7:
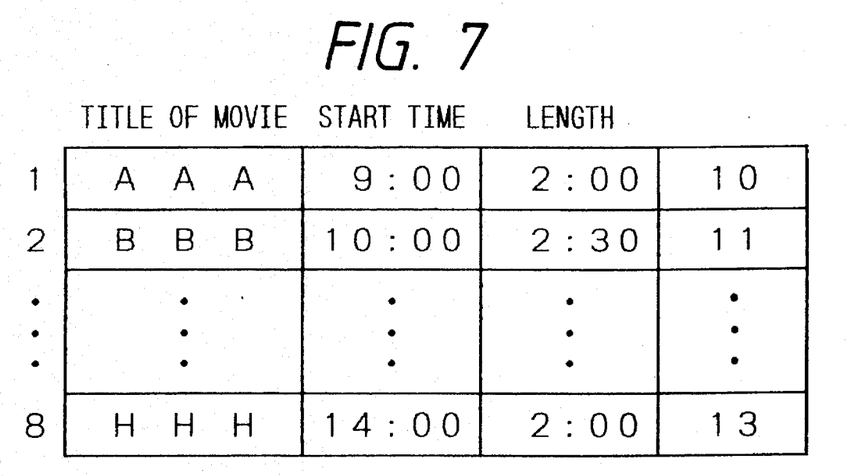
FIG. 7 shows a data table.
Figure 8:
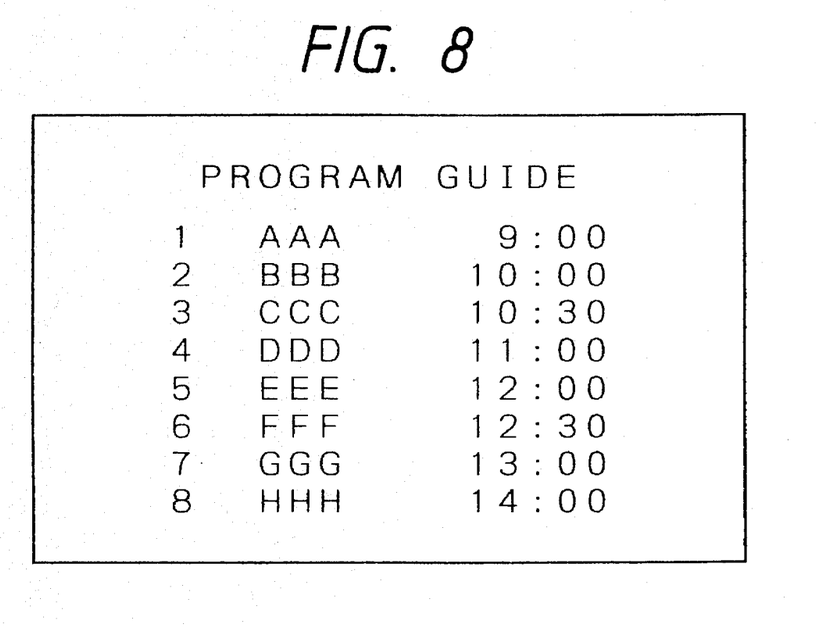
FIG. 8 shows a picture displayed on a TV receiver and indicating programs of linked channels.

If the selected linked channel coincides with the initial channel, i.e., if all the in-band data of the linked channels have been analyzed, the CPU 25 produces, on a RAM (not shown) of the memory 26, a data table TB as shown in FIG. 7 based on the received in-band data ID. In the data table TB of FIG. 7, the data of the title, start time and length are rearranged in the order of the start times so as to be associated with the selection numbers. Based on the data table TB, the CPU 25 controls the on-screen control IC 31 to display, on the screen of the television receiver 3, the titles of the movies in the order of the start times (step S5). More specifically, as shown in FIG. 8, the titles and start times are displayed together with the selection numbers.

After performance of the above operation, when the viewer depresses a desired numeral button on the keyboard 29 or remote controller 35 that corresponds to the title of a movie for which he wants to perform a timer reservation (step S6), the selected number on the screen flashes and a timer reservation of the program of the selected number becomes possible. When the enter button $K_6$ is depressed in this state, the CPU 25 write the start time data, length data and channel number data of the movie corresponding to the selected number into a timer reservation area of a RAM (not shown) of the memory 26 (step S7).

Monitoring present time data provided from the FSK receiver 24 or a built-in clock (not shown), the CPU 25 automatically turns on the power of the TV receiver 3 when the start time of the reserved movie has come. The CPU 25 monitors the present time by continually comparing the current time of day with the start time of the selected program. After the turning on of the TV receiver 3 (or immediately after reaching the start time if the TV receiver 3 is already turned on), the CPU 25 selects the channel of the reserved movie to start a display of the movie. Once the present time of day reaches the end time of the selected program, the CPU 25 prohibits further viewing of the selected program. This prohibiting operation includes muting the sound of the movie and tuning the selector 21 back to the initial or original channel.

As described above, according to the embodiment, the viewer can reserve a desired program simply by inputting a selection number corresponding to the program while watching the screen of the TV receiver 3. That is, the timer reservation can be performed very easily. As a result, the possibility can be greatly reduced that the user makes a mistake in performing a timer reservation.

While in the above embodiment the titles, start times and lengths, etc. of movies are transmitted from the center facility 101 to the terminal apparatus 102 in the form of in-band data, they may be transmitted in the form of out-band data. While in the above embodiment each link information indicates one related channel number, it may indicate a plurality of related channel numbers.

Further, the center facility 101 deletes, from the in-band data or out-band data, information of the programs whose broadcast has already been finished, and instead add information of other programs to that data.

What is claimed is:

1. A cable television (CATV) terminal apparatus for receiving a television signal transmitted from a CATV center facility and providing the received television signal to a television receiver (TV receiver), comprising:

means for displaying, on the TV receiver upon receiving a first instruction from a user, information indicating programs being broadcast and scheduled to be broadcast over a set of linked channels based on program data transmitted from the center facility wherein the linked channels are channels logically coupled to each other, the program data for each of said linked channels including titles, start times, lengths of the respective programs and linking information which identifies another one of said linked channels;

means for receiving a second instruction indicating one of the programs that has been selected by the user;

means for storing data indicating the start time, length and channel of the selected program; and means for automatically displaying, on the TV receiver based on the stored data, the selected program during a period defined by the start time and the length.

2. The terminal apparatus according to claim 1, wherein said displaying means further includes means for listing information related only to programs from channels identified by said linking channel information.

3. The terminal apparatus according to claim 1, wherein said displaying means further includes:

means for registering a current channel as an initial channel, means for recognizing the program data for said current channel including a next linked channel, means for determining whether said recognized next linked channel is equal to said initial channel.

4. A terminal apparatus according claim 3, wherein said displaying means further includes:

means for registering said recognized next linked channel as a current channel, when said recognized next linked channel is not equal to said initial channel, and means for displaying a menu of programs, when said recognized next linked channel corresponds to said initial channel.

5. A cable television (CATV) system comprising:

a center facility for transmitting over a set of linked channels, in addition to television signals, program data including titles, start times, lengths and linking information of respective programs being broadcast and scheduled to be broadcast, said linking information identifying a set of linked channels wherein linked channels are channels logically coupled to each other, and forming a ring-type link between said linked channels; and a plurality of terminal apparatuses, each comprising:

means for displaying, on an associated television receiver (TV receiver) upon receiving a first instruction from a user, information indicating the programs based on the program data transmitted from the center facility;

means for receiving a second instruction indicating one of the programs that has been selected by the user;

means for storing data indicating the start time, length and channel of the selected program; and means for automatically displaying, on the associated TV receiver based on the stored data, the selected program during a period defined by the start time and the length.

6. The CATV system of claim 5, wherein said link information is comprised of a channel number identifying a channel of said set of linked channels.

7. A CATV system according to claim 5, wherein said displaying means further includes means for listing information related only to programs from channels identified by said linking channel information.

8. The system according to claim 5, wherein said displaying means further includes:

means for registering a current channel as an initial channel, means for recognizing the program data for said current channel including a next linked channel, means for determining whether said recognized next linked channel is equal to said initial channel.

9. The system according to claim 8, wherein said displaying means further includes:

means for registering said recognized next linked channel as a current channel, when said recognized next linked channel is not equal to said initial channel, and displaying a menu of programs, when said recognized next linked channel corresponds to said initial channel.

10. A method for reserving a broadcast program and displaying the reserved program in a cable television (CATV) system, comprising the steps of:

displaying, on a television receiver (TV receiver) connected to a terminal apparatus, a menu of programs being broadcast and scheduled to be broadcast over a set of linked channels based on program data transmitted from a center facility wherein linked channels are channels logically coupled to each other, the program data including titles, start times, lengths of the respective programs and linking information identifying another one of said linked channels, said menu including programs only from channels linked to one another by said linking information;

receiving, from a user, an instruction indicating one of the programs that has been selected by the user;

storing data indicating the start time, length and channel of the selected programs;

comparing a present time with the start time of the selected program;

first tuning the terminal apparatus to a channel indicated by said stored data and displaying the selected program on the TV receiver, when the present time has reached the start time;

comparing the present time with an end time of the selected program that is the start time plus the length; and prohibiting the display of subsequent programs broadcast on a selected channel which broadcasts chargeable programs, when the present time has reached the end time.

11. The method of claim 10, wherein said link information is comprised of a channel number identifying a channel of said set of linked channels.

12. The method of claim 10, wherein the program data is transmitted from the center facility as in-band data.

13. The method claim 10, wherein said prohibiting step further comprises a step of muting a sound of the selected program.

14. The method of claim 10, wherein said prohibiting step further comprises a step of tuning the terminal apparatus back to an original channel representing a channel to which said terminal apparatus was tuned prior to said first tuning step.

15. A method for reserving a broadcast program according to claim 10, wherein said displaying step further comprises the steps of:

registering a current channel as an initial channel, recognizing the program data for said current channel including a next linked channel, determining whether said recognized next linked channel is equal to said initial channel.

16. A method for reserving a broadcast program according to claim 15, wherein said displaying step further comprises the steps of:

registering said recognized next linked channel as the current channel, when said recognized next linked channel is not equal to said initial channel, and displaying said menu of programs, when said recognized next linked channel corresponds to said initial channel.

* * * * *